(12) United States Patent
Pellegatti et al.

(10) Patent No.: US 10,174,137 B2
(45) Date of Patent: Jan. 8, 2019

(54) BUTENE-1 TERPOLYMERS AND PROCESS FOR THEIR PREPARATION

(75) Inventors: Giampaolo Pellegatti, Boara (IT); Stefano Spataro, Ferrara (IT)

(73) Assignee: Basell Poliolefine Italia S.r.I., Milan (IT)

(*) Notice: Subject to any disclaimer, the term of this patent is extended or adjusted under 35 U.S.C. 154(b) by 1752 days.

(21) Appl. No.: 12/451,142

(22) PCT Filed: Apr. 11, 2008

(86) PCT No.: PCT/EP2008/054392
§ 371 (c)(1),
(2), (4) Date: Oct. 27, 2009

(87) PCT Pub. No.: WO2008/132035
PCT Pub. Date: Jun. 11, 2008

(65) Prior Publication Data
US 2010/0119752 A1 May 13, 2010

Related U.S. Application Data

(60) Provisional application No. 60/926,465, filed on Apr. 27, 2007.

(30) Foreign Application Priority Data

Apr. 27, 2007 (EP) .................... 07107102

(51) Int. Cl.
*C08F 210/08* (2006.01)
*C08F 4/44* (2006.01)
*C08F 10/08* (2006.01)

(52) U.S. Cl.
CPC ............ *C08F 10/08* (2013.01); *C08F 210/08* (2013.01); *Y10T 428/139* (2015.01)

(58) Field of Classification Search
CPC .................................................. C08F 210/08
USPC ........................................... 526/348.6, 348.7
See application file for complete search history.

(56) References Cited

U.S. PATENT DOCUMENTS

| | | | |
|---|---|---|---|
| 4,220,554 A | 9/1980 | Scatá et al. | |
| 4,298,718 A | 11/1981 | Mayr et al. | |
| 4,309,522 A | 1/1982 | Dietrich et al. | |
| 4,399,054 A | 8/1983 | Ferraris et al. | |
| 4,469,648 A | 9/1984 | Ferraris et al. | |
| 4,495,338 A | 1/1985 | Mayr et al. | |
| 5,221,651 A | 6/1993 | Sacchetti et al. | |
| 5,578,541 A | 11/1996 | Sacchetti et al. | |
| 5,585,317 A | 12/1996 | Sacchetti et al. | |
| 5,693,729 A * | 12/1997 | Fushimi et al. | ........... 526/125.3 |
| 5,726,261 A | 3/1998 | Sacchetti et al. | |
| 6,127,304 A | 10/2000 | Sacchetti et al. | |
| 6,306,996 B1 | 10/2001 | Cecchin et al. | |
| 6,323,152 B1 | 11/2001 | Sacchetti et al. | |
| 6,388,028 B2 | 5/2002 | Sacchetti et al. | |
| 6,407,028 B1 | 6/2002 | Sacchetti et al. | |
| 6,437,061 B1 | 8/2002 | Sacchetti et al. | |
| 6,605,676 B1 | 8/2003 | Vega et al. | |
| 6,686,307 B2 | 2/2004 | Sacchetti et al. | |
| 6,998,458 B2 | 2/2006 | Vitale et al. | |
| 7,160,964 B2 | 1/2007 | Bigiavi et al. | |
| 8,101,695 B2 * | 1/2012 | Resconi | ................. C08F 10/00 502/103 |
| 8,344,086 B2 * | 1/2013 | Pellegatti | ............. C08F 210/08 526/348 |
| 2004/0254323 A1 | 12/2004 | McDaniel et al. | |
| 2006/0155071 A1 | 7/2006 | Morini et al. | |
| 2008/0004409 A1 | 1/2008 | Bacci et al. | |
| 2009/0326156 A1 * | 12/2009 | Pellegatti | ............. C08F 210/08 525/240 |
| 2010/0324238 A1 * | 12/2010 | Resconi | ............... C08F 210/08 526/121 |
| 2011/0003939 A1 * | 1/2011 | Spataro | ................ C08F 210/08 525/240 |
| 2011/0034658 A1 * | 2/2011 | Pellegatti | ............. C08F 210/08 526/348.6 |

FOREIGN PATENT DOCUMENTS

| | | | |
|---|---|---|---|
| EP | 23249 | 2/1981 | |
| EP | 172961 | 3/1986 | |
| EP | 302 297 A1 * | 7/1988 | ............ C08F 210/08 |
| EP | 302297 | 2/1989 | |
| EP | 302297 A1 * | 2/1989 | ............ C08F 210/08 |
| EP | 395083 | 10/1990 | |
| EP | 553805 | 8/1993 | |
| EP | 553806 | 8/1993 | |
| EP | 601525 | 6/1994 | |
| EP | 719797 | 7/1996 | |
| EP | 1215239 | 6/2002 | |
| EP | 1215239 A1 * | 6/2002 | ............. C08L 23/20 |
| EP | 1219645 | 7/2002 | |
| EP | 1219645 A1 * | 7/2002 | ............. C08F 10/08 |
| EP | 1308466 | 5/2003 | |
| JP | S6424812 A | 1/1989 | |
| WO | 98/044009 | 10/1998 | |
| WO | 99/045043 | 9/1999 | |
| WO | 03/099883 | 12/2003 | |
| WO | 04/000895 | 12/2003 | |
| WO | 04/048424 | 6/2004 | |
| WO | WO 2004048424 A1 * | 6/2004 | ............ C08F 210/08 |
| WO | 06/042815 | 4/2006 | |
| WO | 08/017525 | 2/2008 | |

* cited by examiner

*Primary Examiner* — Rip A Lee

(57) ABSTRACT

Butene-1 terpolymers having
a content of propylene derived units of 0.5-13% mol, and
a content of ethylene derived units of 1-3% mol,
a ratio C3/C2 of the content of propylene and ethylene derived units is of from 1 to 10, said butene-1 terpolymers having a melt flow rate MIE, measured at 190° C./2.16 Kg of from 0.3 to 3 g/10 min, and a molecular weight distribution curve determined by GPC with a ratio Mw/Mn of from 4 to 10, and the portion of molecular weights of $1 \times 10^5$ or lower, accounting for 22% or larger of the total area.

6 Claims, No Drawings

BUTENE-1 TERPOLYMERS AND PROCESS FOR THEIR PREPARATION

This application is the U.S. national phase of International Application PCT/EP2008/054392, filed Apr. 11, 2008, claiming priority to European Application 07107102.1 filed Apr. 27, 2007 and the benefit under 35 U.S.C. 119(e) of U.S. Provisional Application No. 60/926,465, filed Apr. 27, 2007; the disclosures of International Application PCT/EP2008/054392, European Application 07107102.1 and U.S. Provisional Application No. 60/926,465, each as filed, are incorporated herein by reference.

The present invention relates to butene-1 terpolymers containing up to 16% by mol of ethylene and propylene derived units, and to a process for their preparation.

The invention further relates to the articles obtained from the butene-1 terpolymers of the invention. In particular the present invention relates to butene-1 terpolymers characterized by a specific set of chemical and physical properties.

Butene-1 (co) polymers are well known in the art. In view of their good properties in terms of pressure resistance, creep resistance, and impact strength they are mainly used in the manufacture of pipes to be used in the metal pipe replacement. Despite their good properties, the performances of butene-1 articles, and in particular pipes, sometimes resulted to be not completely satisfactory in terms of general mechanical performances.

Under Floor Heating (UFH) is a particularly demanding application in the field of pipes requiring the highest possible pressure and temperature resistance together with high flexibility and elasticity (low memory effect after bending). Particularly flexibility and elasticity are required for ease of installation on site.

Therefore, it would be desirable to improve butene-1 (co) polymers known in the art, so as to have articles (in particular pipes) having a set of mechanical properties capable of providing pressure and creep resistance and excellent flexibility and elasticity of the pipe obtained thereof.

The butene-1 (co) polymers can be prepared by polymerizing butene-1 in the presence of $TiCl_3$ based catalyst components together with diethylaluminum chloride (DEAC) as cocatalyst. In some cases diethyl aluminum iodide (DEAI) is also used in mixtures with DEAC. The polymers obtained, however, generally do not show satisfactory mechanical properties.

Furthermore, in view of the low yields obtainable with the $TiCl_3$ based catalysts, the polybutenes prepared with these catalysts have a high content of catalyst residues (generally more than 300 ppm of Ti) which lowers the properties of the polymers making it necessary a deashing step.

Butene-1 (co) polymers can also be obtained by polymerizing the monomers in the presence of a stereospecific catalyst comprising (A) a solid component comprising a Ti compound and an electron-donor compound supported on $MgCl_2$; (B) an alkylaluminum compound and, optionally, (C) an external electron-donor compound.

A process of this type is disclosed in EP-A-172961. This process allows the preparation of rigid butene-1 (co) polymers containing a small amount from 0 to 1 mole % of an olefin comonomer, other than butene-1, and having an intrinsic viscosity [η] of from 1.5 to 4, as measured in decalin at 135° C., an isotacticity value of at least 95% and a Molecular Weight Distribution (MWD), expressed in terms of Mw/Mn, of not more than 6.

WO2004/048424 discloses butene-1 (co) polymers obtained with a sequential polymerization process in two liquid phase reactors (example 11). It is laid open the possibility to tailor the operating conditions in the two reactors in order to obtain different average molecular weights in the two reactors and therefore broader molecular weight distribution optionally of bimodal type.

In WO1999/045043 a butene-1 polymer having high crystallinity and a broad molecular weight distribution is described. The polymer is obtained by sequential polymerization in two reactors under different conditions in the presence of a stereospecific $MgCl_2$ supported catalyst thereby obtaining MWD of 6 or higher. In the Example 1 and 2 of this patent application, where the MWD is very broad (10.3 and 8 respectively), the strength at break is good (37.8 and 38 MPa) but the Flexural Modulus is too high (570 and 430 Mpa). WO 2003/099883 describes butene-1 (co) polymers that are characterized by a medium/narrow MWD (Mw/Mn lower than 6) exhibit suitable mechanical properties and long times pressure resistance but the flexural modulus is still very high.

EP 1219645 describes a butene-1 (co) polymer comprising 20 mol % or less of an alpha-olefin other than butene, having a large MWD (Mw/Mn equal to or higher than 6) characterized by a GPC distribution curve exhibiting a portion of molecular weights of $6 \times 10^5$ or higher, accounting for 20% or larger of the total area, which is defined as the area surrounded with the GPC curve and the horizontal axis. The (co)polymers in EP 1219645 are obtained by mixing resins having different MFR values thus obtaining improvement in the mouldability of rigid and pressure resistant compositions for pipes.

In EP 1308466 a butene-1 (co) polymer comprising 20 mol % or less of an alpha-olefin, other than butene, is described and it is laid open the possibility that the butene copolymer may be a terpolymer containing a third alfa-olefin in small amounts not detrimental to the properties of the co-polymer. In EP 1215239 a poly-1-butene composition is obtained by blending polybutene-1-(co) polymers with a propylene (co) polymer thus obtaining shortening of curing time and better processability without deteriorating creep resistance and flexibility.

In EP0302297 terpolymers of butene-1 are disclosed having X-ray crystallinity of 5 to 60% and a maximum melting temperature of 110° C.

All the above said butene polymers are suitable for the manufacture of pipes but it is still felt the need for butene-1 polymers providing improved properties and particularly for Under Floor Heating (UFH) application, requiring, as above said, flexibility and elasticity combined with pressure and temperature resistance.

It is therefore an object of the present invention to provide a butene-1 terpolymer having:
- a content of propylene derived units of 0.5-13% mol, preferably of 0.7-12.9% mol, more preferably of 2.6-5.2% mol, and
- a content of ethylene derived units of 0.5-3% mol, preferably of from 1 to less than 2% mol,
- a ratio C3/C2 of the molar content of propylene and ethylene derived units of from 1 to 10, preferably from 2 to 8, more preferably from 2 to 4;

said butene-1 terpolymer also has a melt flow rate (MIE), measured at 190° C./2.16 Kg, of from 0.3 to 3 g/10 min and a molecular weight distribution (MWD) curve determined by GPC with a ratio Mw/Mn of from 4 to 10, preferably from 5 to 9, and the portion of molecular weights of $1 \times 10^5$ or lower, accounting for 22% or larger of the total area. The said total area can be defined as the area surrounded by the GPC curve resulting from substantially complete elution of the polymer. It is normally calculated by integrating the GPC curve with a baseline drawn from the elution starting point to the elution end point. Commonly available integration software can be used for such purpose. The resulting area is therefore the area surrounded by the GPC curve and the baseline. The portion of molecular weights of $1 \times 10^5$ or lower is represented by the portion of said area below $1 \times 10^5$, corresponding to molecular weights of the eluted polymer of $1 \times 10^5$ or lower. Preferred are those Butene-1 terpolymers with a MWD curve of bimodal type.

Preferred are those Butene-1 terpolymers, particularly consisting of two polymeric components of different average molecular weight (i.e. different melt flow rate range):

1) from 40 to 60% wt of a first component consisting of a copolymer of butene-1 having
    a content of propylene derived units of 0.5-13% mol, preferably of 0.7-12.9% mol, more preferably of 2.6-5.2% mol,
    a content of ethylene derived units of 0.5-3% mol, preferably of from 1 to less than 2% mol,
    a melt flow rate (MIF), measured at 190° C./21.6 Kg, of from 10 to 45 g/10 min, preferably from 15 to 45 g/10 min, and
2) from 60 to 40% wt of a second component consisting of a copolymer of butene-1 having a melt flow rate (MIE), measured at 190° C./2.16 Kg, of from 0.5 to 20 g/10 min, preferably from 4.5 to 18 g/10 min; this second component (2) being selected from the group consisting of:
    a) a copolymer of butene-1 with propylene having a content of propylene derived units of 0.5-13% mol, preferably of 0.7-12.9% mol, more preferably of 2.6-5.2% mol, and
    b) a copolymer of butene-1 with propylene and ethylene having
        a content of propylene derived units of 0.5-13% mol, preferably of 0.7-12.9% mol, more preferably of 2.6-5.2% mol, and
        a content of ethylene derived units of 0.5-3% mol, preferably of from 1 to less than 2% mol, Component 1) is essentially a higher average molecular weight terpolymer of butene-1 obtainable copolymerizing butene-1, propylene and ethylene as comonomers in definite amounts.

Component 2) is essentially a lower average molecular weight terpolymer or copolymer of butene-1 obtainable copolymerizing butene-1 with propylene or copolymerizing butene-1, propylene and ethylene as comonomers in definite amounts.

It is evident from the above definitions that the term terpolymer is used herein to define a polymer or a polymeric composition containing units derived from three types of monomers (i.e. butene-1, propylene and ethylene). The terpolymer according to the invention preferably comprise two components of different molecular weight (molecular weight bimodality) having same or different composition (compositional bimodality) in terms of copolymerized comonomers in the two components. Therefore, the terpolymer of the present invention can be a single polymer, obtained in a single polymerization step, or a blend of polymeric components, wherein each component is a butene copolymer or terpolymer and each component has a content of butene-1 derived units of 84% by mole or more.

The butene-1 terpolymers of the invention preferably have:
    solubility in xylene at room temperature (25° C.) over 5% wt, preferably from 5.5 to 7.5 wt,
    melt flow rate (MIE), measured at 190° C./2.16 Kg, comprised in the range of from 0.4 to 1.5 and particularly from 0.5 to 1.2 g/10 min,
    melting temperature (Tm1) preferably over 110° C.,
    isotacticity of 93% or more, preferably of 94% or more, more preferably of 95% or more, measured in terms of butene isotactic triads as derivable from $C^{13}$ NMR spectra collected with a 600 MHz spectrometer according to known methods, using the butene-1 methine region according to the following formula:

isotacticity=$(A1/(A1+A2)) \times 100$ wherein
A1 is the whole area between 35.35 and 34.90 ppm,
A2 is the area between 34.90 and 34.50 ppm
Chemical shift basis: butene unit side chain methylene (mmmm)=27.73

The terpolymers of the present invention can be obtained by blending polymeric components 1) and 2) as above defined, or by direct polymerization of the comonomers in a polymerization process carried out in one step or more reactors. A sequential polymerization process, generally carried out in two or more reactors, is preferred.

The polymerization of the monomers to obtain the copolymers to be blended or to obtain directly the final terpolymer is conducted in the presence of a stereospecific catalyst comprising (A) a solid component comprising a Ti compound and an internal electron-donor compound supported on $MgCl_2$; (B) an alkylaluminum compound and, optionally, (C) an external electron-donor compound.

Magnesium dichloride in active form is preferably used as a support. It is widely known from the patent literature that magnesium dichloride in active form is particularly suited as a support for Ziegler-Natta catalysts. In particular, U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium and y is a number between 1 and n, can be used.

The internal electron-donor compound is preferably selected from esters and more preferably from alkyl, cycloalkyl or aryl esters of monocarboxylic acids, for example benzoic acids, or polycarboxylic acids, for example phthalic or succinic acids, the said alkyl, cycloalkyl or aryl groups having from 1 to 18 carbon atoms. Examples of the said electron-donor compounds are diisobutyl phthalate, diethylphtahalate and dihexylphthalate. Generally, the internal electron donor compound is used in molar ratio with respect to the $MgCl_2$ of from 0.01 to 1 preferably from 0.05 to 0.5.

The preparation of the solid catalyst component can be carried out according to several methods.

According to one of these methods, the magnesium dichloride in an anhydrous state and the internal electron donor compound are milled together under conditions in which activation of the magnesium dichloride occurs. The so obtained product can be treated one or more times with an excess of TiCl$_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the internal electron donor compound is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is pre-activated according to well known methods and then treated with an excess of TiCl$_4$ at a temperature of about 80 to 135° C. which contains, in solution, an internal electron donor compound. The treatment with TiCl$_4$ is repeated and the solid is washed with hexane in order to eliminate any non-reacted TiCl$_4$.

A further method comprises the reaction between magnesium alcoholates or chloroalcoholates (in particular chloroalcoholates prepared according to U.S. Pat. No. 4,220,554) and an excess of TiCl$_4$ comprising the internal electron donor compound in solution at a temperature of about 80 to 120° C.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3 preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The internal electron donor compound can be added during the treatment with TiCl$_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44001.

The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

The external donors (C) are preferably selected among silicon compounds of formula R$_a^5$R$_b^6$Si(OR$^7$)$_c$, where a and b are integer numbers from 0 to 2, c is an integer from 1 to 3 and the sum (a+b+c) is 4; R$^5$, R$^6$, and R$^7$ are alkyl, cycloalkyl or aryl radicals with 1-18 carbon atoms optionally containing heteroatoms. A particularly preferred group of silicon compounds is that in which a is 0, c is 3, b is 1 and R$^6$ is a branched alkyl or cycloalkyl group, optionally containing heteroatoms, and R$^7$ is methyl. Examples of such preferred silicon compounds are cyclohexyltrimethoxysilane, t-butyltrimethoxysilane and thexyltrimethoxysilane. The use of thexyltrimethoxysilane is particularly preferred.

The electron donor compound (C) is used in such an amount to give a molar ratio between the organoaluminum compound and said electron donor compound (c) of from 0.1 to 500, preferably from 1 to 300 and more preferably from 3 to 100.

In order to make the catalyst particularly suitable for the polymerization step, it is possible to pre-polymerize said catalyst in a pre-polymerization step. Said prepolymerization can be carried out in liquid, (slurry or solution) or in the gas-phase, at temperatures generally lower than 100° C., preferably between 20 and 70° C. The pre-polymerization step is carried out with small quantities of monomers for the time which is necessary to obtain the polymer in amounts of between 0.5 and 2000 g per g of solid catalyst component, preferably between 5 and 500 and, more preferably, between 10 and 100 g per g of solid catalyst component.

The polymerization process can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred.

The polymerization is generally carried out at temperature of from 20 to 120° C., preferably of from 40 to 90° C. The polymerization can be carried out in one or more reactors that can work under same or different reaction conditions such as concentration of molecular weight regulator, comonomer concentration, temperature, pressure etc. Working in more than one reactor under different conditions can lead to the preparation of butene-1 copolymers with different average molecular weight in the two reactors and therefore with a broader molecular weight distribution and of bimodal type. Moreover, working in more than one reactor under different conditions has the advantage that the various polymerization step can be properly modulated so as to properly tailoring the properties of the final polymer. In comparison with a process of mechanically blending polymers having different molecular weight, the multistep or sequential polymerization process is preferred and has the advantage of producing polymers having good homogeneity, notwithstanding the large difference in the molecular parameters of the two components.

As a customary routine, the relevant expert can add further polymer components, additives (such as stabilizers, antioxidants, anticorrosives, nucleating agents, processing aids, etc.) and both organic and inorganic fillers which can impart specific properties, without departing from the gist of the invention.

The following examples are given in order to better illustrate the invention without limiting it.

Characterization

Comonomer Content

Determined by I.R. spectroscopy according to the following methods.

Determination of ethylene percent by weight (% C2 wt) in modified polybutene over the range from 0 to 12% wt ethylene:

the spectrum of a pressed film of the polymer is recorded in absorbance vs. wavenumbers ($cm^{-1}$). The following measurements are used to calculate C2 content:

a) area (At) of the combination absorption bands between 4482 and 3950 $cm^{-1}$ which is used for spectrometric normalization of film thickness.

b) factor of subtraction (FCRC2) of the digital subtraction between the spectrum of the polymer sample and a reference spectrum (named C2PB) which consists of the absorption band due to the sequences BEE and BEB (B: 1,butene units, E: ethylene units) of the methylenic groups (CH2 rocking vibration).

c) Area ($A_{C2,block}$) of the residual band after subtraction of the C2PB spectrum. It comes from the sequences EEE of the methylenic groups (CH2 rocking vibration).

Analysis time: 20 minutes

Determination of propylene percent by weight (% C3 wt) in isotactic polybutene modified with propylene over the range from 0.5 to 18% wt:

The spectrum of a pressed film of the polymer is recorded in absorbance vs. wavenumbers ($cm^{-1}$) at a temperature T=130° C. The following measurements are used to calculate C3 content:

a) area (At) of the combination absorption bands between 4482 and 3950 $cm^{-1}$ which is used for spectrometric normalization of film thickness.

b) Height (DC3) of the regularity band due to propylene units centered at about 820 $cm^{-1}$ (maximum of the peak), after a proper spectroscopic subtraction of a reference spectrum of a polybutene homopolymer recorded at 130° C.

Analysis time: 30 minutes

Determination of Polydispersity Index.

This property is strictly connected with the molecular weight distribution of the polymer under examination. In particular it is inversely proportional to the creep resistance of the polymer in the molten state. Said resistance called modulus separation at low modulus value (500 Pa), was determined at a temperature of 200° C. by using a parallel plates rheometer model RMS-800 marketed by RHEOMETRICS (USA), operating at an oscillation frequency which increases from 0.1 rad/sec to 100 rad/second. From the modulus separation value, one can derive the P.I. by way of the equation:

$$P.I.=54.6\times(\text{modulus separation})^{-1.76}$$

in which the modulus separation is defined as:

modulus separation=frequency at $G'$=500 Pa/frequency at $G''$=500 Pa wherein $G'$ is storage modulus and $G''$ is the loss modulus.

Determination of the Melt Flow Rate (MFR)

Measured according to the method ISO 1133

MWD determination by Gel Permeation Chromatography (GPC)

MWD curves are determined using a Waters 150-C ALC/GPC system equipped with a Infrared detector IR4 POLI-MERCHAR and with a TSK column set (type GMHXL-HT) working at 135° C. with 1,2,4-trichlorobenzene as solvent (TCB) (stabilized with 0.1 vol. of 2, 6-di-t-butyl p-cresole (BHT)) at flow rate of 1 ml/min. The sample is dissolved in TCB by stirring continuously at a temperature of 140° C. for 1 hour.

The solution is filtered through a 0.45 μm Teflon membrane. The filtrate (concentration 0.08-1.2 g/l injection volume 300 μl) is subjected to GPC. Monodisperse fractions of polystyrene (provided by Polymer Laboratories) were used as standard. The universal calibration for PB copolymers was performed by using a linear combination of the Mark-Houwink constants for PS (K=1.21×10-4 dl/g; α=0.706) and PB(K=1.78×10-4 dl/g; α=0.725), PE (K=4.06×10-4 dl/g; α=0.725), PP (K=1.90×10-4 dl/g; α=0.725) weighted for the comonomer content in the terpolymer.

Data Acquisition and processing was performed with the software Water Empower v.1.

The integration of the MWD curves was performed with a baseline drawn from the elution start time to the elution end time (i.e. starting from the background noise region before the elution peak attributed to the polymer and ending after the peaks region, in the final background noise region). The % Area below $10^5$ was determined as the difference of the total area (100%) and the cumulative % Area calculated starting from the higher molecular weight side down to $10^5$.

Tensile Properties: Strength at Yield, Strength at Break, Elongation at Break:

Measured according to ISO8986-2 using a specimen type ASTM-D638 on a 1.9 mm thick plaque obtained by compression molding (at 200° C. with a cooling of 30° C./min) of a polymer composition obtained by mixing in a Brabender the relevant copolymer sample with 1% 2,6-di-t-butyl-4-methyl phenol (BHT) at 180° C.

Before testing, 1.9 mm thick plaques are put into an autoclave at 200 bars for 10 min at room temperature in order to accelerate the phase transformation of PB.

Flexural Modulus:

Measured according to ASTM D 790

Determination of the Melting Points.

The melting points (Tm) of the polymers of the examples were measured by Differential Scanning calorimetry (D.S.C.) on a Perkin Elmer DSC-1 calorimeter, previously calibrated against indium and zinc melting points. The weight of the samples in every DSC crucible was kept at 6.0±0.5 mg.

For the copolymers of the invention the two different crystalline forms of polybutene (i.e. Form I and Form II) are distinguishable, in a DSC melting thermogram, because they have distinct melting points: Form I melts always at higher temperature than Form II. Moreover, Form II precipitates during the crystallization from the melt while the more stable Form I forms upon annealing at room temperature for a certain amount of time.

The data acquisition in continuous heating mode has been carried out as follows:

a) The weighted sample was sealed into aluminum pans and heated to 180° C. at 10° C./minute. The sample was kept at 180° C. for 5 minutes to allow a complete melting of all the crystallites, then cooled to −20° C. at 10° C./minute. After standing 2 minutes at −20° C., the sample was heated for the second time to 180° C. at 10° C./min. In this second heating run, the peak temperature was taken as the melting temperature of Form II (Tm II) and the area of the peak as its melting enthalpy (ΔHf).

b) annealing of the samples at room temperature for different length of time (from a few hours up to several days);

c) heating up scan from room temperature to 180° C. with heating rate of 10° C./min to obtain the thermograms necessary to measure the evolution of the Form II→Form I solid-solid transformation, thus measuring the melting temperature of Form I (Tm I).

Flexural Hysteresis

The specimen is a 4 mm compression moulded used for Flexural Modulus ISO 178 as well as the apparatus.

The specimen is aged in an autoclave with oil at 2000 bar at T=23° C. for 10 min in order to accelerate the phase transformation.

After 24 hours the analysis is performed with a Flexural Modulus ISO 178 set up. A deformation is applied to the specimen of 10% with respect to rest position of the specimen. The specimen is deformed at 2 mm/min The total energy ($E_{total}$) applied to be deformed is equal to the energy absorbed ($E_{absorbed}$-plastic energy) plus the Energy released ($E_{released}$-elastic energy)

The hystresis parameter is calculated as =$100 \times (E_{total} - E_{released})/E_{total}$ The lowest is the value of hysteresis parameter the more the product is elastic and react better to a bending ratio of 10%.

EXAMPLES

Preparation of Solid Catalyst Component

Into a 500 ml four-necked round flask, purged with nitrogen, 225 ml of TiCl$_4$ were introduced at 0° C. While stirring, 6.8 g of microspheroidal MgCl$_2$.2.7C$_2$H$_5$OH (prepared as described in Ex. 2 of U.S. Pat. No. 4,399,054 but operating at 3,000 rpm instead of 10,000) were added. The flask was heated to 40° C. and 4.4 mmoles of diisobutylphthalate were thereupon added. The temperature was raised to 100° C. and maintained for two hours, then stirring was discontinued, the solid product was allowed to settle and the supernatant liquid was siphoned off.

200 ml of fresh TiCl$_4$ were added, the mixture was reacted at 120° C. for one hour then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

Examples 1-2 Preparation of Butene-1/Propylene/Ethylene Copolymers (Terpolymers) by Sequential Copolymerization In examples 1-2 the sequential polymerization was carried out after a precontacting step, in two liquid-phase stirred reactors (R1, R2) connected in series in which liquid butene-1 constituted the liquid medium. During the precontacting step the solid catalyst component, the Al-Alkyl compound TIBAL (i.e. triisobutylaluminum) and the external donor thexyltrimethoxysilane were pre-mixed under the conditions reported in table 1. The catalyst system was injected into the first reactor working under the conditions reported in table 1.

After the first polymerization step the content of the first reactor was transferred into the second reactor where the polymerization continued under the conditions reported in the same table 1. The polymerization was stopped by killing the catalyst and transferring the polymerized mass in the devolatilization step.

A detailed description of the process is found in the International Patent Application WO04/000895.

The results of the characterization carried out on the obtained terpolymers are reported in Table 1b.

Comparative Example 1 (1C): Butene-1/Ethylene Copolymer

The polymerization was carried out as in example 1 and 2 under the conditions reported in the same Table 1.

The characterization of the copolymer is reported in Table 2.

Comparative Example 2 (2C): Butene-1 Homo-Polymer

A commercial Butene-1 homopolymer grade produced by Basell under the trade name PB0110M having a melt flow rate value (MIE measured at 190° C. and 2.16 Kg) of 0.4 g/10 min, density 0.914 Kg/dm$^3$. The properties of the polymer were measured for comparison purpose and reported in Table 2.

It is evident from the examples and the comparative examples the role of the comonomer (i.e. ethylene and propylene) and their amount to target properties that are not simply due to a large molecular weight distribution (comparative 2c) nor are obtainable without the presence of both ethylene and propylene as comonomers (comparative 1c).

TABLE 1

| Polymerization Process | | | | |
|---|---|---|---|---|
| | | | EXAMPLES | |
| | | 1C | 1 | 2 |
| PRECONTACTING | | | | |
| temperature | ° C. | 9 | 9 | 9 |
| Al-Alkyl/donor | g/g | 76 | 86 | 84 |
| Al-Alkyl/catalyst | g/g | 87 | 92 | 100 |
| POLYMERIZATION First reactor | | | | |
| temperature | ° C. | 70 | 70 | 70 |
| C4-reactor feed | g/h | 132000 | 135000 | 118000 |
| C3-reactor feed | g/h | no | 1480 | 940 |
| C2-reactor feed | g/h | 250 | 250 | 170 |
| H2 reactor feed | g/h | 1.4 | 1.25 | 1.08 |
| Residence time | min | 89 | 88 | 99 |
| C3-BONDED | % wt | — | 3.36 | 3.46 |
| C2-BONDED | % wt | 0.5 | 0.6 | 0.8 |
| split | % wt | 50 | 50 | 50 |
| MIE | g/10 min | 0.19 | 0.17 | 0.15 |
| MIF | g/10 min | 44.8 | 40.1 | 35.9 |
| Second reactor | | | | |
| temperature | ° C. | 75 | 75 | 75 |
| C4-reactor feed | g/h | 25000 | 25000 | 25400 |
| C3-reactor feed | C3— (g/h) | no | 300 | 500 |
| C2-reactor feed | C2— (g/h) | no | no | 110 |
| H2 reactor feed | H2 (g/h) | 21.7 | 18 | 14 |
| Residence time | (min) | 76 | 75 | 83 |
| split | % wt | 50 | 50 | 50 |
| MIE (calculated) | | 9 | 14 | 15 |
| ADDITIVE | | | | |
| Irganox 10120/ Irganox 1070 (70:30) | ppm | 453 | 781 | 663 |

TABLE 2

Final polymer structure and properties

| | | EXAMPLES | | | |
|---|---|---|---|---|---|
| | | 1C | 1 | 2 | 2C |
| C3-BONDED | % wt | — | 2.76 | 2.6 | — |
| C2-BONDED | % wt | 0.5 | 0.55 | 0.8 | — |
| C3-BONDED | % mol | — | 3.3 | 3.1 | — |
| C2-BONDED | % mol | 1.2 | 1 | 1.2 | — |
| C3/C2 mol ratio | | | 3.3 | 2.5 | |
| C3/C2 wt ratio | | | 5.01 | 3.25 | |
| Tm(II) | ° C. | 109 | 104 | 99 | 117 |
| Tm(I) | | 122 | 117 | 113 | 128 |
| xilene soluble fraction | % wt | 2.25 | 6.5 | 6.7 | 2.01 |
| I.V. of xylene-soluble fraction | dl/g | 1.99 | 1.96 | 2.04 | 2.3 |
| MIE (190° C./2.16 Kg) | g/10 min | 0.91 | 0.9 | 0.8 | 0.4 |
| | MIE Finale | 0.9 | 1 | 0.95 | |
| PI | | 7.8 | 7.3 | 7.1 | 7.2 |
| Mw/Mn | | 6.2 | 6 | 5.6 | 5.6 |
| % Area GPC Below $1 \times 10^5$ | | 26.6 | 25.8 | 23.4 | 23.7 |
| Density | Kg/dm$^3$ | 0.9096 | 0.9083 | 0.9064 | 0.914 |
| Flexural Modulus* | MPa | 327 | 300 | 281 | 450 |
| Strength at Yield | MPa | 19 | 17.9 | 18.1 | 19.5 |
| Strength at Break | MPa | 37.2 | 35.9 | 39.6 | 35 |
| Elongation at Break | % | 340 | 360 | 370 | 300 |
| Isteresi parameter | | | | | |
| $E_{total}$ | Joule | 0.0056 | 0.01 | 0.0048 | 0.0072 |
| $E_{absorbed}$ | Joule | 0.0011 | 0.001 | 0.0008 | 0.0018 |
| $E_{released}$ | Joule | 0.0045 | 0.0048 | 0.004 | 0.0054 |
| hystresis parameter | Ratio | 19.691 | 17.259 | 16.582 | 24.576 |

*after aging 10 min in autoclave

What is claimed is:

1. A butene-1 terpolymer comprising:
(A) a propylene content of 0.5-13 mol %;
(B) an ethylene content of 0.5-3 mol %;
(C) a $C_3/C_2$ molar content ratio of propylene to ethylene of 1-10;
(D) a melt flow rate (MIE; ISO 1133, 190° C., 2.16 kg) of 0.3-3 g/10 min;
(E) a molecular weight distribution curve (Mw/Mn, determined by GPC) of 4-10, where a portion of molecular weights of $1 \times 10^5$ or lower is at least 22% of the total area of the molecular weight distribution curve; and
(F) a xylene solubility at 25° C. of over 5 wt % to 7.5 wt %.

2. The butene-1 terpolymer of claim 1, comprising:
(A) 40-60% by weight of a first polymer composition comprising:
(i) 0.5-13 mol % propylene, and
(ii) 0.5-3 mol % ethylene,
wherein the first polymer composition has a melt flow rate, measured at 190° C./21.6 kg, of 10-45 g/10 min; and
(B) 60-40% by weight of a second polymer composition selected from the group consisting of
(i) a copolymer of butene-1 and propylene comprising: 97-99.5 mol % of butene-1 derived units, and 0.5-13 mol % of propylene derived units, and
(ii) a copolymer of butene-1, propylene and ethylene comprising:
0.5-13 mol % of propylene derived units, and
0.5-3 mol % of ethylene derived units,
wherein the second polymer composition has a melt flow rate (MIE, ISO 1133, 190° C., 2.16 kg) of 0.5-10 g/10 min.

3. A manufactured article comprising the butene-1 terpolymer of claim 2.

4. The manufactured article of claim 3, wherein the article is a pipe.

5. A process for the preparation of the butene-1 polymer composition of claim 2, comprising copolymerizing butene-1, ethylene and propylene in the presence of a stereospecific catalyst comprising (A) a solid catalyst component comprising a Ti compound and an internal electron donor compound supported on $MgCl_2$; (B) an alkylaluminum compound; and (C) an external electron donor compound comprising thexyltrimethoxysilane, wherein the process is carried out in liquid butene-1.

6. The process of claim 5 in which the co-polymerization is carried out in at least two reactors operating under the same or different reaction conditions selected from the group consisting of molecular weight regulator concentration, comonomer concentration, temperature, pressure and combinations thereof.

* * * * *